United States Patent [19]

Mori

[11] Patent Number: 4,699,448

[45] Date of Patent: Oct. 13, 1987

[54] TRANSPARENT OPTICAL CONDUCTOR FOR REFLECTING AND RADIATING OUT OF THE CONDUCTOR LIGHT RAYS TRANSMITTED THROUGH THE CONDUCTOR

[76] Inventor: Kei Mori, 3-16-3-501, Kaminoge, Setagaya-ku, Tokyo, Japan

[21] Appl. No.: 788,988

[22] Filed: Oct. 18, 1985

[30] Foreign Application Priority Data

Jan. 21, 1985 [JP] Japan .................................. 60-8897

[51] Int. Cl.$^4$ .............................................. G02B 6/00
[52] U.S. Cl. .............................. 350/96.10; 350/96.15; 350/259; 350/264; 362/32
[58] Field of Search ............... 350/96.10, 96.15, 96.18, 350/96.19, 96.20, 96.24, 96.28, 258–265, 418; 362/32

[56] References Cited

U.S. PATENT DOCUMENTS

| | | | |
|---|---|---|---|
| 3,510,195 | 5/1970 | Noble | 350/96.24 |
| 3,514,192 | 5/1970 | De La Cierva | 350/418 X |
| 4,609,974 | 9/1986 | Mori | 362/32 |

OTHER PUBLICATIONS

Cronquist, D. H. "Hollow Reflecting Light Collecting Tube", IBM Technical Disclosure Bulletin, vol. 17, No. 3, 8-1974 pp. 906–908.

Primary Examiner—John Lee
Attorney, Agent, or Firm—Jordan and Hamburg

[57] ABSTRACT

A light radiator for effectively diffusing radiating light rays, transmitted through an optical conductor cable or the like, out of the optical conductor cable. The light radiator includes a transparent cylinder positioned almost horizontally, an optical conductor for guiding light rays into the cylinder, an optical means movably installed in the cylinder for reflecting the light rays guided into the cylinder and for radiating the reflected light rays out of the cylinder and driving means for moving the optical means along an axis of the cylinder. The optical means includes a cylindrical member having an outer diameter approximately equal to an inner diameter of the cylinder. One end surface of the cylindrical member is inclined in relation to an axis line of the cylindrical member and is formed as a reflection surface. A cavity is provided at a longer-axis side of the cylindrical member to eliminate the need for complex regulation means to regulate the direction of reflection of the light rays.

17 Claims, 8 Drawing Figures

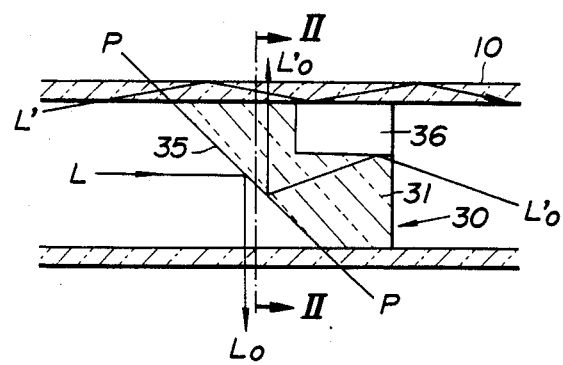
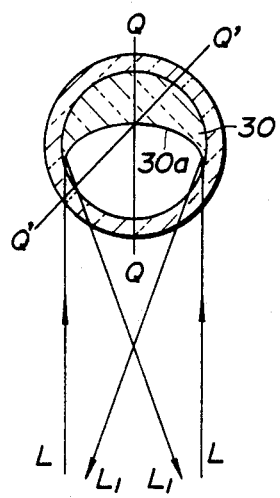
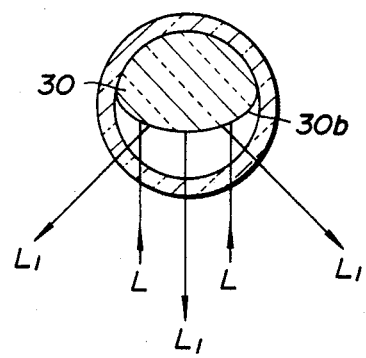
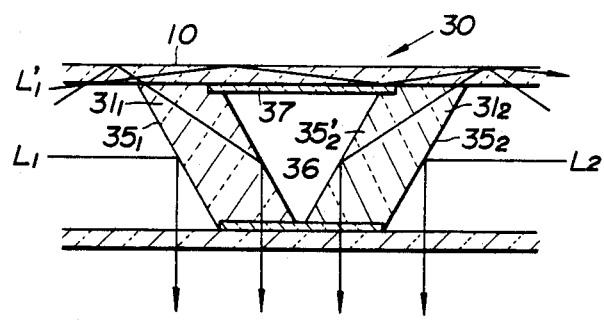

TRANSPARENT OPTICAL CONDUCTOR FOR REFLECTING AND RADIATING OUT OF THE CONDUCTOR LIGHT RAYS TRANSMITTED THROUGH THE CONDUCTOR

BACKGROUND OF THE INVENTION

The present invention relates to a light radiator for effectively diffusing and radiating light rays, which have been transmitted through an optical conductor cable or the like out of of the optical conductor cable.

The present applicant has previously proposed various ways to focus solar rays or artificial light rays by use of lenses or the like, to guide the rays into an optical conductor cable, and thereby to transmit them onto an optional desired place through the optical conductor cable. The solar rays or the artificial light rays transmitted and emitted in such a way are employed for photosynthesis, for use in illuminating, or for other like purposes, for example, to promote the cultivation of plants.

However, when utilizing light energy for cultivating plants as mentioned above, light rays transmitted through an optical conductor cable have directional characteristics. If the end portion of an optical conductor cable is cut off and light rays are emitted therefrom, the radiation angle for the focused light rays is, in general, equal to approximately 46°, which is quite narrow. When utilizing light energy as described above, it is impossible to attain a desirable amount of illumination simply by cutting off the end portion of an optical conductor cable and letting the light rays emit therefrom.

Therefore, the present applicant has already proposed various kinds of light radiators capable of effectively diffusing light rays which have been transmitted through an optical conductor cable and radiating them for illumination over a desired area.

SUMMARY OF THE INVENTION

It is an object of the present invention to provide a light radiator capable of effectively emitting solar rays or artificial light rays transmitted through an optical conductor cable out of the same for nurturing plants.

It is another object of the present invention to provide a light radiator capable of effectively moving an optical means installed in a transparent cylinder.

It is another object of the present invention to provide a light radiator in which an optical means moving in a cylinder has a buoyancy for always directing light rays reflected on the optical means to a predetermined direction.

It is another object of the present invention to provide a light radiator constructed simply and at a lower cost which is capable of effectively diffusing light rays.

The above-mentioned features and other advantages of the present invention will be apparent from the following detailed description which goes with the accompanying drawings.

BRIEF DESCRIPTION OF THE DRAWINGS

FIG. 2 is a cross-sectional view of an embodiment of a light radiator according to the present invention;

FIG. 3(A) and FIG. 3(B) are respectively cross-sectional views taken along the line II—II of FIG. 2.

FIGS. 4, 5, 6(A) and 6(B) are respectively cross-sectional views of the main part construction of other embodiments of light radiators according to the present invention.

DESCRIPTION OF THE PREFERRED EMBODIMENT

Figure 1:
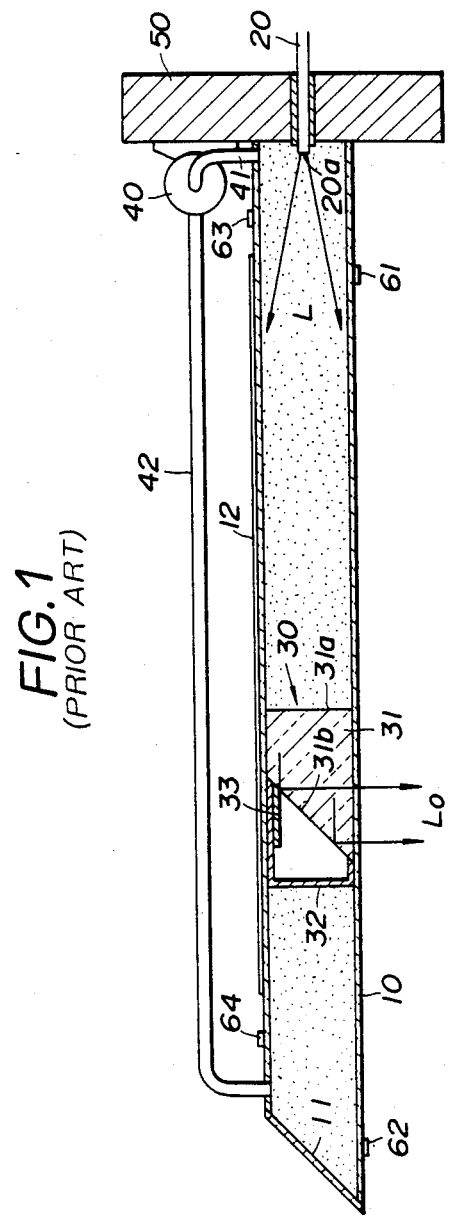
FIG. 1 is a cross-sectional side view of an embodiment of a conventional light radiator previously proposed.

FIG. 1 is a cross-sectional view of an embodiment of a light radiator previously proposed by the present applicant. In FIG. 1, 10 is a transparent cylinder, 20 an optical conductor, 30 an optical means, 40 a pump, and 50 a foundation.

The cylinder 10 is filled with water or optical oil. A light emitting end portion 20a of the optical conductor 20 is installed at one end portion of the cylinder 10. The light rays transmitted through the optical conductor 20 are emitted into the cylinder 10 from the light emitting end portion 20a of the optical conductor 20 and transmitted in the cylinder 10 toward the other end portion thereof by being reflected on the inner wall surface and outer wall surface of the cylinder 10.

A cylindrical optical means 30 is movably installed in the cylinder 10. The optical means 30 consists of a cylindrical optical conductor 31 having one end surface 31a at a light ray transmission side which is formed on a plane surface (not inclined), another surface 31b opposite thereto which is formed on an inclined surface, and a cover member 32 for forming an air chamber at the side of the inclined surface 31b by tightly closing the side of the inclined surface 31b.

Consequently, light rays L guided into the cylinder 10 enter the optical means 30 through the plane 31a of the optical conductor 31 and are reflected on the inclined surface 31b at the opposite side of the optical conductor 31. Reflected light rays Lo are emitted out of the cylinder 10. Plants or the like are raised beneath the cylinder 10. In this manner, the light rays emitted from the cylinder 10 are supplied to the plants as a photo-synthesis reaction light source for the plants.

Furthermore, an open end of a pipe 41 is located at one end portion of the cylinder 10 and that of another pipe 42 is located at another end portion thereof. A differential pressure is applied between the right side and the left side of the optical means 30 by use of pipes 41 and 42. The optical means 30 can be moved to the right and left in the cylinder 10 by the action of the above-mentioned differential pressure. In such a manner, it is possible to supply the light rays to the plants.

In FIG. 1, 61 and 62 are photo sensors mounted on an outer circumferential surface of the cylinder 10 at the side where the light rays reflected by the optical means 30 pass through. The arrival of the optical means 30 at the right end of the cylinder 10 is detected by the photo sensor 61. The detection signal thereof controls the pump 40 so as to generate a differential pressure for moving the optical means 30 to the left. On the other hand, the arrival of the optical means 30 at the left end of the cylinder 10 is detected by the photo sensor 62. The detection signal thereof controls the pump 40 to generate a differential pressure for moving the optical means 30 to the right.

Photo sensors 61 and 62 are constructed to be capable of being mounted on and removed from the cylinder 10, or to be movable along the cylinder 10. In such a manner, when plants are small, the photo sensors 61 and 62 can be arranged at a smaller distance, and when the plants grow up and become taller, the distance between them can be widened. Therefore, the light rays transmitted through the optical conductor 20 can be effectively supplied to the plants. A reflection surface 11 is installed at the left end of the cylinder 10, that is, at the end portion thereof at the side opposite to the optical conductor 20. The light rays leaking leftward from the cylinder 10 after passing through the optical means 30 are reflected on the reflection surface 11 and discharged to the outside portion of the cylinder 10.

A permanent magnet 33 is installed on the outer circumferential surface of the optical means 30, at a location where the light rays reflected on the reflection surface 31b of the optical means 30 can pass through without being interrupted. When permanent magnet or magnetic substance 33 is unitarily attached to the optical means 30, it is possible to detect the position of the optical means by detecting the permanent magnet or magnetic substance 33. On that occasion, magnetic sensors 63 and 64 are employed instead of the photo sensors 61 and 62.

Moreover, a position signal detected by the magnetic sensors 63 and 64 is used for controlling the pump 40, as in the case of the afore-mentioned photo sensors. Namely, the optical means 30 is moved to the right and left in accordance with the detected position signal. However, in relation to the movement area of the optical means, it is not always necessary to move the optical means within the designated area by detecting the position thereof. Instead, the revolution of the liquid pump 40 is repeatedly reversed in an appropriate timing. In such a manner, the movement area of the optical means can be easily remotely controlled.

A permanent magnet or magnetic substance 12 installed on the outer surface of the cylinder 10 is elongated along the axis of the cylinder 10. The optical means 30 is regulated to move it in a desired direction by use of the permanent magnet or magnetic substance 12. At least one of the permanent magnet or magnetic substance 33 installed on the optical means 30 and the permanent magnet or magnetic substance 12 installed on the cylinder 10 is constructed of a permanent magnet. Consequently, a magnetic attractive force occurs between permanent magnets or magnetic substances 33 and 12. The optical means 30 therefore is moved by the action of the magnetic force, when the permanent magnet or magnetic substance 33 is opposed to the permanent magnet or magnetic substance 12 on the cylinder 10.

However, the light radiator as mentioned heretofore comprises the permanent magnet or magnetic substance 12 installed on the outer circumferential surface of the cylinder 10 along the axis direction thereof and the permanent magnet (or magnetic substance) 33, in order to direct the light rays reflected by the optical means 30 to a desired direction. Therefore, the above-mentioned light radiator has some defects in that construction of the optical means 30 is complicated, manufacturing of the optical means 30 becomes difficult and thus the cost greatly increases. Further, on some occasion, an extremely long piece measuring several meters is employed as the cylinder 10. Therefore, the permanent magnet 12 installed on the outer circumferential surface of the cylinder 10 is necessarily extremely long and thereby the cost of the permanent magnet 12 inevitably increases.

The present invention was made in consideration of the actual circumstances as mentioned above. In particular, the primary object of the present invention is to provide a light radiator in which the optical means moving in the cylinder has a buoyancy for always directing the light rays reflected on the optical means to a predetermined direction. As a result, regulation means for regulating the reflecting direction of the reflected light rays from the optical means, which has been needed in the prior art, may be omitted so that the light radiator can be constructed simply and at a lower cost.

FIG. 2 is a cross-sectional view side illustrating the main part of a light radiator according to the present invention. In FIG. 2, 10 is a transparent cylinder, and 30 is an optical means moving in the cylinder 10 as mentioned above. One end surface 35 of the optical means 30 is formed as an inclined surface. Inclined surface 35 is formed as a reflection surface. Consequently, light rays L guided into the cylinder 10 from the optical conductor cable not shown in FIG. 2 are reflected on the inclined reflection surface 35. The reflected light rays Lo are discharged out of the cylinder 10.

According to the present invention, when the cylinder 10 is employed, it is positioned almost horizontally. In the optical means 30, as shown in FIG. 2, a cavity 36 is provided at the longer axis side of optical conductor 30. Consequently, in the optical means 30, the shorter axis side thereof is always located at the lower side so that the light rays are always emitted downward from the cylinder 10. Therefore, it is not necessary to provide a regulation means for regulating the direction of the light ray radiation by the use of permanent magnet means which has been needed in the prior art. It follows that the light radiator can be constructed simply and at a lower cost.

If the right end of the cylinder 10, not shown in FIG. 2, is formed as a reflection surface, for instance, light rays L' propagate through the tube wall of the cylinder 10 to the right side of the optical means 30 and are reflected on the reflection surface. The reflected light rays Lo' propagate back into the cylinder 10 and are reflected on the bordering surface of the cavity portion 36 and radiated out of the cylinder 10. These radiated light rays can be also utilized.

FIG. 3(A) and FIG. 3(B) are respectively cross-sectional views taken along the light II—II of FIG. 2. The inclined reflection surface 35 is usually a plane surface. However, it is possible to form it as a concave surface 30a in relation to the axis Q—Q parallel with the inclined surface 35 as shown in FIG. 3(A), or to form it as a convex surface 30b in relation to the same as shown in FIG. 3(B). If the inclined surface 35 is formed as a concave or convex surface in such a manner, the light rays reflected on the inclined surface can be focused or diffused so that the light rays can be distributed preferably for the employment purpose thereof. Moreover, if the axis Q—Q is inclined to Q'—Q' in relation to the vertical axis as shown in FIG. 3(A), the light rays reflected on the reflection surface can be directed obliquely downward.

FIG. 4 is a cross-sectional side view of another embodiment of the present invention. In this embodiment, the optical conductor 30 has both ends formed as inclined reflection surfaces $35_1$ and $35_2$ and is so constructed that light rays reflected on both reflection surfaces are directed in the same direction. According to this embodiment, the light rays $L_1$ and $L_2$ can be guided into the cylinder 10 from both directions and reflected on the respective inclined reflection surfaces $35_1$ and $35_2$ to the same direction.

Consequently, according to this embodiment, the light rays can be guided into the cylinder 10 from both sides thereof, so that a larger amount of light rays can be diffused over a wider area using only a single optical means. Moreover, in the embodiment, the optical means 30 consists of a first optical conductor $31_1$ having an inclined reflection surface $35_1$, a second optical conductor $31_2$ having an inclined reflection surface $35_2$, and a transparent cylindrical body 37 for connecting the optical conductor $31_1$ with the optical conductor $31_2$.

Both optical conductors $31_1$ and $31_2$ are tightly fixed to both sides of the cylindrical body 37. The respective inclined reflection surfaces $35_1$ and $35_2$ of the optical conductors $31_1$ and $31_2$ are respectively located outside of the cylindrical body 37 and light rays reflected on both reflection surfaces $35_1$ and $35_2$ are directed in the same direction. In such a construction, a cavity 36 is formed in the optical means 30. The cavity 36 is formed larger at the longer axis side of the optical means 30 than at the shorter axis side thereof, as shown in FIG. 4. Consequently, in the embodiment, the longer axis side of the optical means 30 is always located at the upper side. As in the case of the embodiment shown in FIG. 2, the regulation means for regulating the direction of the reflected light rays is not needed, so that a light radiator of simple and low-cost construction can be provided.

Figure 5:
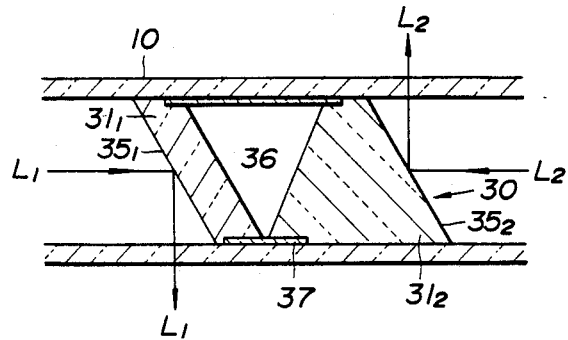

FIG. 5 is a cross-sectional view of still another embodiment of the present invention. In this embodiment, the inclining direction at one of the inclined reflection surfaces as shown in FIG. 4 is reversed while the inclining direction at another inclined surface is left as it is. Namely, in the embodiment shown in FIG. 5, the light rays $L_1$ reflected on the inclined reflection surface $35_1$ are directed downward from the cylinder 10 and the light rays $L_2$ reflected on the inclined reflection surface $35_2$ directed upward therefrom. In such a manner, light rays can be radiated upward and downward from the cylinder 10 by use of only one optical means.

Furthermore, in the embodiments shown in FIG. 4 and FIG. 5, the inclined reflection surface can be concave or convex as in the case of the embodiment shown in FIG. 2, and the end surface of the cylinder 10 can be formed as a reflection surface. Further, it will be easily understood that the axis of the inclined surface can be inclined in relation to the vertical axis as explained in FIG. 3(A).

In the embodiments shown in FIG. 4 and FIG. 5, an example of guiding light rays from both ends of the cylinder 10 has been explained. However, it is not always necessary to guide light rays from both ends thereof. Even when guiding light rays from only one end, the following effect can be expected. Namely, suppose the end surface of the cylinder 10 is formed as the reflection surface. For instance, when light rays are guided from the left end of the cylinder 10 and the right end thereof is formed as the reflection surface in FIG. 4, the light rays $L_1'$ propagating through the tube wall of the cylinder 10 toward the right side of the optical means 30 are reflected on the reflection surface not shown in FIG. 4 at the right end of the cylinder 10. The reflected light rays propagated in the cylinder 10 from the right to the left just like the afore-mentioned light rays $L_2$. Further, the light rays are reflected on the reflection surface $35_2'$ and discharged out of the cylinder 10.

Figure 6A:
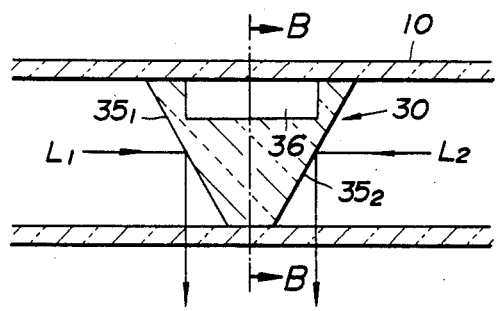
Figure 6B:
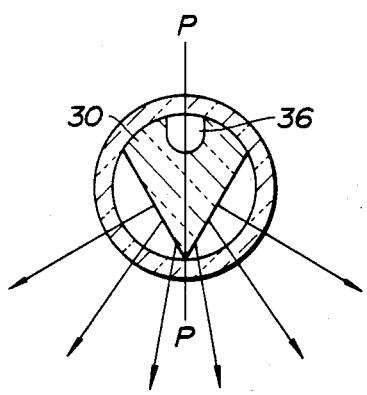

FIG. 6 is a cross-sectional view of still another embodiment of the present invention. FIG. 6(A) is a cross-sectional side view thereof and FIG. 6(B) is a cross-sectional view taken along the line B—B of FIG. 6(A). In this embodiment, the afore-mentioned reflection surfaces 35, $35_1$ and $35_2$ are divided in two forming a border line at the vertical center axis P—P, as shown in FIG. 6(B). Consequently, according to the embodiment of FIG. 6, the light rays can be illuminated downward or upward from the cylinder 10 over a wider area.

As is apparent from the foregoing description, according to the present invention, it is possible to provide a light radiator constructed simply and at a lower cost and capable of effectively diffusing light rays.

I claim:

1. A light radiator comprising a transparent cylinder having first and second ends and an essentially horizontal axis, an optical conductor for guiding light rays into said cylinder through said first end thereof, optical means movably installed in said cylinder for reflecting said light rays guided into said cylinder from said optical conductor and radiating the reflected light rays out of said cylinder, driving means for moving said optical means along the horizontal axis of said cylinder, said optical means comprising a cylindrical member having an outer diameter approximately equal to an inner diameter of said cylinder, said cylindrical member having a first end surface inclined in relation to an axis line of said cylindrical member, said inclined first end surface being formed as a reflection surface, a second end surface and first and second side surfaces connecting said first and second end surfaces, said first side surface being longer than said second side surface, and means defining a cavity within said cylindrical member along the first side surface of said cylindrical member, said cavity being isolated from fluid communication with said cylinder.

2. A light radiator as defined in claim 1, wherein said inclined surface of said optical means forms a convex plane in relation to an axis line parallel with said inclined surface.

3. A light radiator as defined in claim 2, wherein said axis line parallel with said inclined surface is inclined in relation to a vertical axis.

4. A light radiator as defined in claim 1, wherein said inclined surface of said optical means forms a concave plane in relation to an axis line parallel with said inclined surface.

5. A light radiator as defined in claim 4, wherein said axis line parallel with said inclined surface is inclined in relation to a vertical axis.

6. A light radiator as defined in claim 1, wherein the second end of said cylinder is formed as a reflection surface and said cylindrical member is made from a transparent material.

7. A light radiator as defined in claim 1, wherein said cylindrical member of said optical means further comprises at least one further inclined reflection surface intersecting a vertical diameter of said cylinder for reflecting light rays obliquely downwardly from said cylinder.

8. A light radiator comprising a transparent cylinder having first and second ends and an essentially horizontal axis, an optical conductor means for guiding light rays into said cylinder through at least said first or said second end thereof, optical means movably installed in said cylinder for reflecting said light rays guided into said cylinder from said optical conductor means and radiating the reflected light rays out of said cylinder, driving means for moving said optical means along the horizontal axis of said cylinder, said optical means comprising a cylindrical member having an outer diameter approximately equal to an inner diameter of said cylinder, said cylindrical member having first and second end surfaces inclined in relation to an axis line of said cylindrical member, said first and second inclined end surfaces being formed as reflection surfaces, and first and second side surfaces connecting said first and second end surfaces, said first side surface being longer than said second side surface, and means defining a cavity within said cylindrical member extending from said first side surface towards said second side surface and decreasing in size from said first side surface towards said second side surface, said cavity being isolated from fluid communication with said cylinder.

9. A light radiator as defined in claim 8, wherein said cylindrical member is made from a transparent material.

10. A light radiator as defined in claim 8, wherein at least said first or said second end of said cylinder is formed as a reflection surface.

11. A light radiator as defined in claim 8, wherein at least one of said inclined surfaces of said optical means forms a convex plane in relation to an axis line parallel with said inclined surface.

12. A light radiator as defined in claim 11, wherein said axis line parallel with said inclined surface is inclined in relation to a vertical axis.

13. A light radiator as defined in claim 8, wherein at least one of said inclined surfaces of said optical means forms a concave plane in relation to an axis line parallel with said inclined surface.

14. A light radiator as defined in claim 13, wherein said axis line parallel with said inclined surface is inclined in relation to a vertical axis.

15. A light radiator as defined in claim 8, wherein said reflection surfaces of said optical means are inclined such that all light rays reflected on said reflection surfaces are directed downward together from the essentially horizontally axis of the transparent cylinder.

16. A light radiator as defined in claim 8, wherein said reflection surfaces of said optical means are inclined such that light rays reflected from said first reflection surface are directed downward from said cylinder and light rays reflected from said second reflection surface are directed upward from said cylinder.

17. A light radiator as defined in claim 8, wherein said cylindrical member of said optical means further comprises at least one further inclined reflection surface intersecting a vertical diameter of said cylinder for reflecting light rays obliquely downwardly or obliquely upwardly from said cylinder.

* * * * *